(12) United States Patent
Burmeister

(10) Patent No.: US 11,437,878 B2
(45) Date of Patent: Sep. 6, 2022

(54) INTERCONNECTION DEVICE FOR AN ELECTRIC MACHINE

(71) Applicant: Bayerische Motoren Werke Aktiengesellschaft, Munich (DE)

(72) Inventor: Uwe Burmeister, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 257 days.

(21) Appl. No.: 16/819,407

(22) Filed: Mar. 16, 2020

(65) Prior Publication Data
US 2020/0220413 A1 Jul. 9, 2020

Related U.S. Application Data

(63) Continuation of application No. PCT/EP2018/074509, filed on Sep. 11, 2019.

(30) Foreign Application Priority Data

Oct. 9, 2017 (DE) ...................... 10 2017 217 962.7

(51) Int. Cl.
*H02K 3/50* (2006.01)
*H01R 25/16* (2006.01)
(Continued)

(52) U.S. Cl.
CPC ............. *H02K 3/50* (2013.01); *H01R 25/162* (2013.01); *H01R 39/02* (2013.01); *H02K 3/522* (2013.01);
(Continued)

(58) Field of Classification Search
CPC ...... H02K 3/50; H02K 3/522; H02K 15/0081; H02K 2203/09; H01R 25/162; H01R 39/02; H01R 2201/26
See application file for complete search history.

(56) References Cited

U.S. PATENT DOCUMENTS

| 5,508,571 A | 4/1996 | Shafer, Jr. |
| 8,443,509 B1 | 5/2013 | De Souza et al. |
| 2003/0201688 A1 | 10/2003 | Yamamura et al. |

FOREIGN PATENT DOCUMENTS

| DE | 103 01 441 A1 | 11/2003 |
| DE | 10 2010 033 699 A1 | 2/2012 |

(Continued)

OTHER PUBLICATIONS

DE102015213502A1_EnglishTranslation (Year: 2022).*
(Continued)

*Primary Examiner* — Tulsidas G Patel
*Assistant Examiner* — Viswanathan Subramanian
(74) *Attorney, Agent, or Firm* — Crowell & Moring LLP

(57) ABSTRACT

An interconnection device for an electric machine, in particular for an electric machine for a motor vehicle, is provided for interconnecting shaped-bar ends of a winding, in particular of a stator winding. The interconnection device has an interconnection element, which has one or more openings for the insertion of at least one shaped-bar end, wherein the one or more openings each have an insertion section and a contact-making section adjoining the insertion section, which sections are designed such that the at least one shaped-bar end can be inserted into the insertion section and, in the case of a relative movement between the opening and the inserted shaped-bar end, the inserted shaped-bar end reaches the contact-making section and the spacing between the at least one shaped-bar end and a contact is reduced by way of being guiding through the contact-making section.

13 Claims, 4 Drawing Sheets

(51) Int. Cl.
H01R 39/02 (2006.01)
H02K 3/52 (2006.01)
H02K 15/00 (2006.01)

(52) U.S. Cl.
CPC ..... *H02K 15/0081* (2013.01); *H01R 2201/26* (2013.01); *H02K 2203/09* (2013.01)

(56) References Cited

FOREIGN PATENT DOCUMENTS

| DE | 10 2013 206 532 A1 | 10/2013 |
| DE | 10 2012 020 329 A1 | 4/2014 |
| DE | 10 2014 007 549 A1 | 11/2015 |
| DE | 10 2015 213 502 A1 | 1/2017 |

OTHER PUBLICATIONS

International Search Report (PCT/ISA/210) issued in PCT Application No. PCT/EP2018/074509 dated Nov. 28, 2018 with English translation (five pages).
German-language Written Opinion (PCT/ISA/237) issued in PCT Application No. PCT/EP2018/074509 dated Nov. 28, 2018 (seven pages).
German-language Search Report issued in German Application No. 10 2017 217 962.7 dated Apr. 6, 2018 with partial English translation (11 pages).

\* cited by examiner

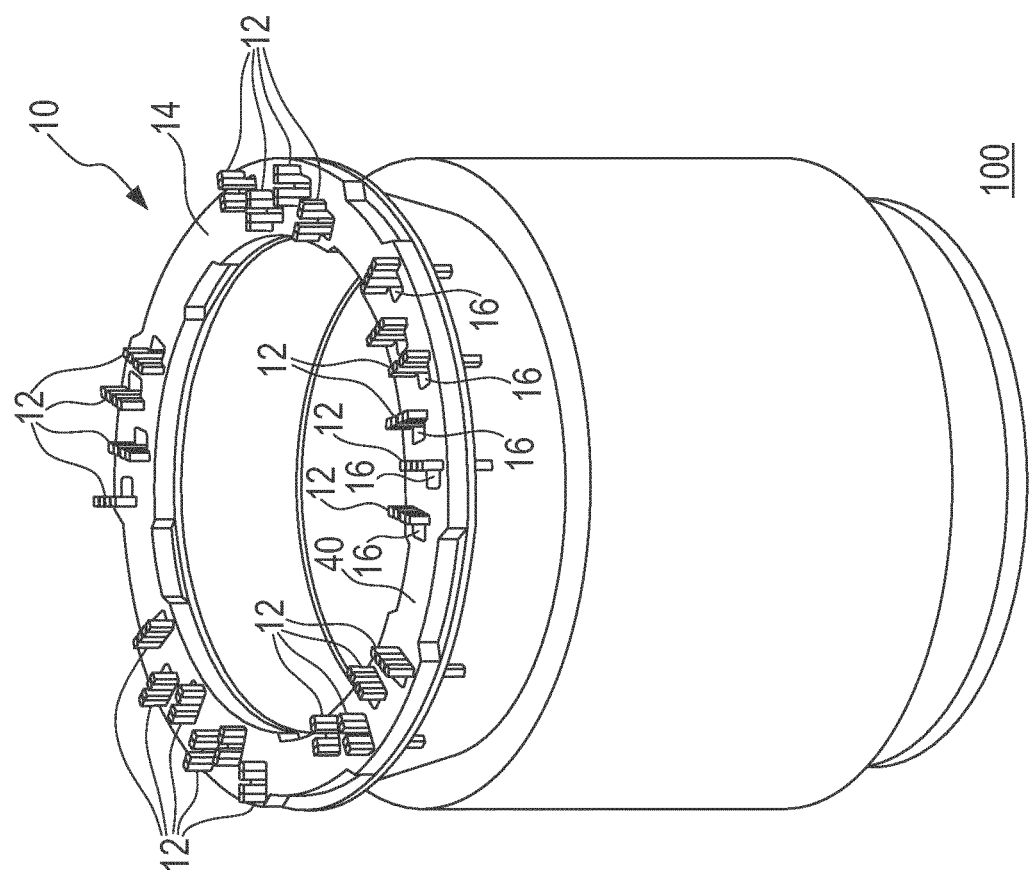
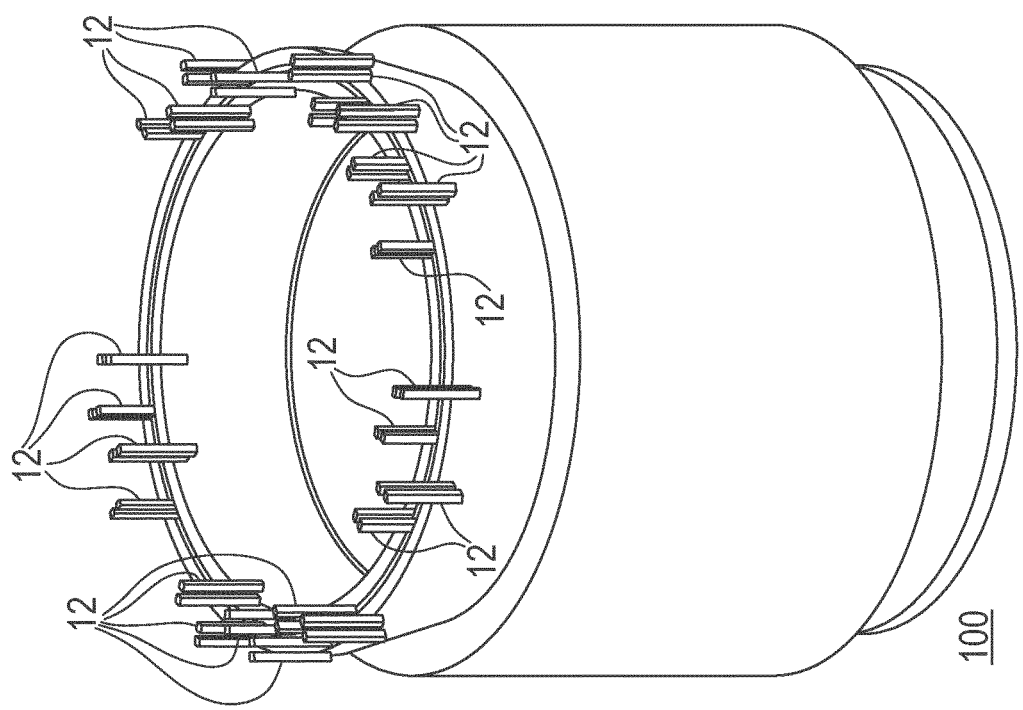

Fig. 4A
Fig. 4B
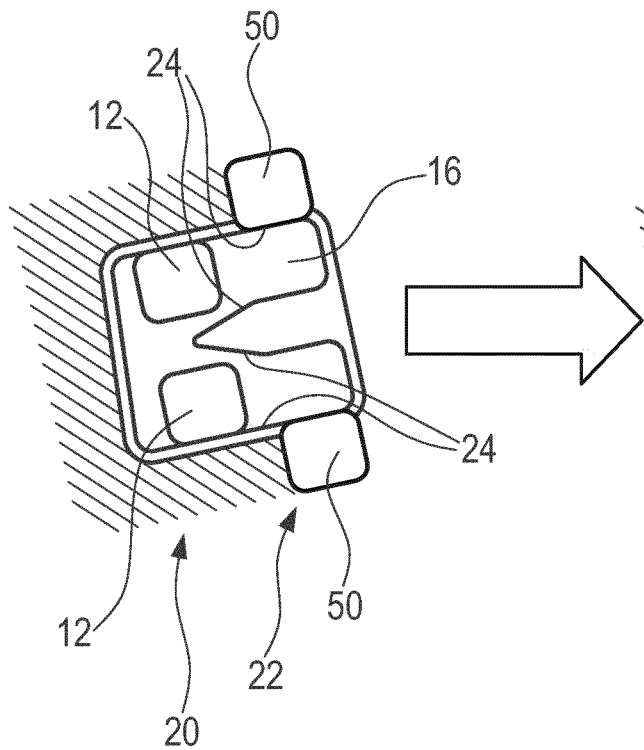
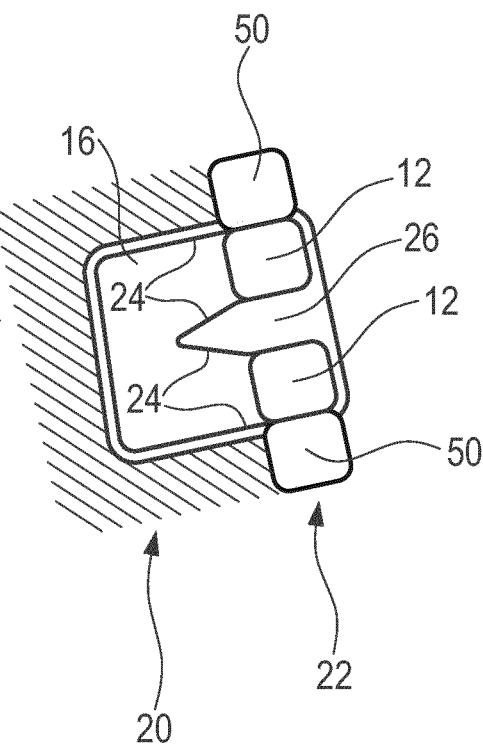

INTERCONNECTION DEVICE FOR AN ELECTRIC MACHINE

CROSS REFERENCE TO RELATED APPLICATIONS

This application is a continuation of PCT International Application No. PCT/EP2018/074509, filed Sep. 11, 2018, which claims priority under 35 U.S.C. § 119 from German Patent Application No. 10 2017 217 962.7, filed Oct. 9, 2017, the entire disclosures of which are herein expressly incorporated by reference.

BACKGROUND AND SUMMARY OF THE INVENTION

The invention relates to an interconnection device for an electric machine, specifically for an electric machine such as an electric motor for a motor vehicle, for the interconnection of shaped-bar ends of a winding, preferably of a stator winding.

The invention further relates to a corresponding method for the assembly of such an interconnection device. The invention moreover relates to an electric machine having such an interconnection device, and to a motor vehicle having such an electric machine.

Electric motors or E-machines (electric machines) are extensively known from the prior art, and are typically electromechanical converters which convert electric power into mechanical power. In conventional electric motors, current-carrying conductor coils or conductor windings generate magnetic fields, the reciprocal attractive and repulsive forces of which are converted into a motion, generally a rotary motion. A conventional electric motor customarily comprises a fixed outer part and an inner part which rotates within the latter. In a conventional manner, one of these parts comprises a permanent magnet, and the respective other part comprises electric coils or windings, or both parts comprise coils.

The stationary, magnetically-active part of an electric motor is described as the stator which, in the case of an "internal rotor", is arranged externally in relation to a rotor and is connected, for example, to an electric motor housing; in the alternative case, i.e. where the stator is arranged internally in relation to the rotor, the electric motor is described as an "external rotor".

Conversely, the moving, generally rotating, magnetically-active part of the electric motor is extensively described—as mentioned above—as the rotor, and customarily comprises a shaft, an armature and a coil, if the armature is not a permanent magnet.

Accordingly, depending upon the type of arrangement of the armature and the coils, a distinction is drawn between internal rotors and external rotors.

Depending upon the type of arrangement of the armature and the coils, and depending upon the type and size of the electric motor, different types of windings can be employed for the coils or the conductor coils. In addition to extensively known manual windings, inter alia, former-wound coils and, specifically in the case of large electric motors and high currents, bar windings, are also increasingly employed.

In the case of a bar winding or a shaped-bar winding, the coil packages are partially constituted by bars which are inserted, for example, in corresponding slots in the stator, in the case of a stator winding and, depending upon the circuit layout of the electric motor, are interconnected or bonded on the respective end faces of the stator.

For the application of a bar winding or shaped-bar winding of this type, in an initial installation step, the shaped-bars which are inserted or arranged in the respective slots of the stator generally project beyond an end face of the stator. In order to make a corresponding interconnection of the projecting ends of the respective shaped-bars, customarily, in a further interconnection step, an interconnection unit for the contact-connection and interconnection of the respective ends is fitted to the end face of the stator. As a result, the ends of the respective shaped bars engage in respective holes in the interconnection unit, and are contact-connected thereafter in accordance with a specific circuit arrangement, for example by welding to other contact bar ends, etc.

Types of interconnections or circuit arrangements of this type can be, for example, a star connection, a connection between planes (upper layer and lower layer), a diverter bridge connection or a phase-to-phase conductor.

However, the contact-connection of a plurality of projecting shaped-bar ends with an interconnection unit of this type is difficult to execute. An interconnection unit, for example in the form of an annular interconnection element, constitutes a support for the simultaneous insertion of a plurality of shaped-bar ends into the respective holes provided in the interconnection unit, notwithstanding the deviation of said shaped-bar ends from their position, as a result of certain tolerances.

The interconnection unit permits the compensation of these tolerances by means of lead-in chamfers on the holes of the interconnection unit, for example on the holes in the interconnection ring of the interconnection unit, or on the respective interconnection contacts.

These lead-in chamfers, in addition to the compensation of tolerances, specifically facilitate the easy insertion of thick shaped-bar ends of a circular or rounded wire cross-section.

However, to some degree, the exceptionally sharp cut edges of the shaped-bar ends which deviate from their position, as a result of tolerances, engage with lead-in chamfers upon the insertion thereof into the respective holes in the interconnection unit, which can result in increased friction forces and the increased abrasion of the carrier of the interconnection unit. As a result, the execution of the installation process of the interconnection unit on the stator can be impaired or, in the worst case, rendered impossible.

Moreover, the lead-in chamfers require a longer lead-in path of the shaped-bar ends into the respective holes, and thus a larger space in the connection direction. It is moreover necessary for any obstruction to be detected during assembly.

The object of the invention is therefore the further development of generic interconnection units, and of assembly methods for such interconnection units, such that the above-mentioned disadvantages can be at least partially overcome. Specifically, the object of the invention is the configuration of generic interconnection units and assembly methods for such interconnection units, such that a simple assembly of the interconnection unit is permitted.

The interconnection device according to the invention for an electric machine, specifically for an electric machine for a motor vehicle, is provided for the interconnection of shaped-bar ends of a winding, such as a stator winding, and comprises an interconnection element, preferably an annular interconnection element, which incorporates one or more openings for the insertion of at least one shaped-bar end. The one or more openings respectively comprise an insertion section and a contact-making section adjoining the latter, which are configured such that the at least one shaped-bar end can be inserted into the insertion section and, in the event of a relative movement between the opening and the inserted shaped-bar end, the inserted shaped-bar end reaches the contact-making section, and the distance between the at least one shaped-bar end and a contact, specifically a contact bar end, is reduced by way of guiding through the contact-making section. According to the invention, the method for assembling the interconnection assembly is thus subdivided into a plurality of sequentially executable functional steps for the movement of the interconnection element, namely, a fitting and a subsequent rotation of the interconnection element. Specifically, the interconnection unit is not initially plugged directly onto the stator or the respective shaped-bar ends in the requisite position for welding, but is initially fitted to the stator, and arranged with a degree of linear offset or rotated about the mid-axis of the electric machine or the electric motor to a position which incorporates larger insertion opening sections, which are configured such that positional tolerances of the respective shaped-bar ends are considered to a sufficient degree, i.e. such that the shaped-bar ends, even in the event of substantial positional deviations within said tolerances, can be inserted into the respective insertion openings. Thereafter, a displacement or rotation of the interconnection unit into a contact-making position in a contact-making section is executed, wherein the respective shaped-bar ends can be contact-connected with contacts, such that the wire edge radii, in combination with the shape of the insertion openings, support the insertion process.

Accordingly, according to the invention, all the shaped rods which are to be contact-connected can be simultaneously inserted into the interconnection unit in a contactless manner. The subsequent transverse movement or rotation employs the edge radii of the shaped bars for the insertion thereof in the contact-making position, and prevents any abrasion or obstruction of the interconnection carrier or of the interconnection contacts associated with cut edges. This movement can be supported by tools.

The interconnection device according to the invention can be further developed, in an advantageous manner, such that the contact-making section comprises a guide apparatus forming the guide, which is designed, in the event of a relative movement between the opening and the shaped-bar end, to reduce the distance between the shaped-bar end and the contact and/or to lead the shaped-bar end onto the contact.

The interconnection device according to the invention can additionally be configured such that the insertion section and the contact-making section, adjoining the latter (in combination) constitute an opening in the form of an elongated hole or a circular arc, wherein an opening surface area reduces from the insertion section through to the contact-making section.

Moreover, the interconnection device according to the invention can be implemented such that the contact-making section comprises a stud section, which is oriented in a longitudinal direction or a circumferential direction to the insertion section, and is centrally arranged, which dictates or defines the distance between two shaped-bar ends which are to be contact-connected. Preferably, two shaped-bar ends in each case are inserted into a respective opening, and by means of the guide, constituted by an opening wall and the central stud section, are brought into a position in the contact-making section in which the shaped-bar ends can be bonded with the contacts, for example by welding or by other connection methods which will be familiar to a person skilled in the art.

The interconnection device according to the invention can further be realized such that the interconnection element comprises a carrier plate and a contact-making plate, wherein the one or more openings are configured in the carrier plate and one or more contact-making openings are configured in the contact-making plate, together with the contacts, wherein the one or more contact-making openings are configured in an overlapping arrangement in relation to the one or more openings.

The electric machine according to the invention is specifically an electric motor for a motor vehicle, wherein the electric machine comprises a stator and the interconnection device according to the invention, wherein the interconnection element of the interconnection device according to the invention is fitted to at least one end of the stator, preferably to an upper end face of the stator, on the shaped-bar ends which project from the stator. Alternatively, the interconnection element can also be fitted to both end faces of the stator.

The vehicle according to the invention is specifically a motor vehicle having the electric machine according to the invention.

The method according to the invention for assembling an interconnection device for an electric machine, specifically for an electric machine for a motor vehicle, is provided for the interconnection of the shaped-bar ends of a winding, preferably for the assembly of the interconnection device according to the invention, wherein the interconnection device comprises an interconnection element which incorporates a plurality of openings for the insertion of at least one shaped-bar end, wherein the openings respectively comprise an insertion section and a contact-making section adjoining the latter, which are configured such that the at least one shaped-bar end can be inserted into the insertion section and, in the event of a relative movement between the opening and the shaped-bar end, said shaped-bar end reaches the contact-making section, and the distance between the at least one shaped-bar end and a contact is reduced by means of guiding through the contact-making section, wherein the method comprises the following steps:

Fitting of the interconnection element to the shaped-bar ends, preferably to the shaped-bar ends which project from one end of a stator of the electric machine, such that the respective shaped-bar ends engage in the respective insertion sections;

Movement, preferably by a rotation of the interconnection element relative to the shaped-bar ends, such that the shaped-bar ends reach the contact-making section, and the distance between the shaped-bar ends and the respective contacts is reduced by means of guiding through the contact-making section.

Accordingly, the properties and advantages described in conjunction with the interconnection device according to the invention are realized in an identical or similar manner, on the grounds of which, for the avoidance of repetitions, reference is made to the preceding statements concerning the interconnection device according to the invention.

The same applies, correspondingly, to the following preferred form of embodiment of the method according to the invention, on the grounds of which reference is also made in this regard to the corresponding statements concerning the interconnection device according to the invention.

The method according to the invention, further to said fitting and movement, can additionally comprise the following step: connection of the shaped-bar ends to the respective contacts, preferably by welding.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1A-1B are schematic representations of a stator of an electric machine according to an embodiment of the invention, and an interconnection device according to an embodiment of the invention.

FIGS. 4A-4B are schematic representations of a preferred functional principle of the interconnection device according to FIG. 2.

DETAILED DESCRIPTION OF THE DRAWINGS

Figure 2A:
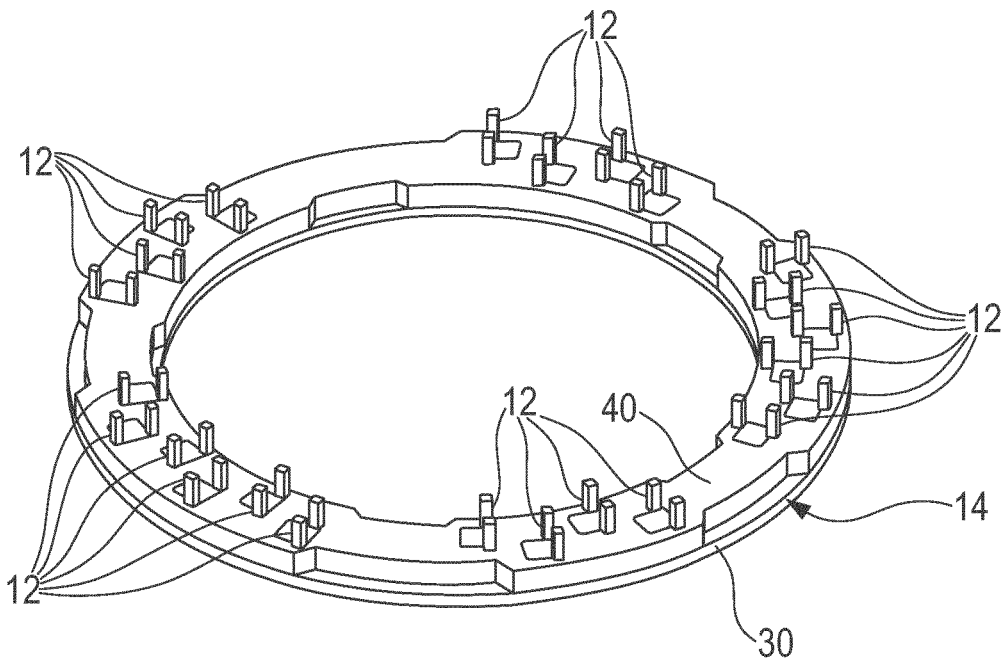
FIGS. 2A-2B are schematic representations of the interconnection device according to FIG. 1.

FIG. 1 shows a schematic representation of a stator 100 of an electric machine, which is not represented in greater detail, and of an interconnection device 10, in the separated state (FIG. 1A) and in the fitted state (FIG. 1B).

The case represented in FIG. 1 involves the stator 100 of an electric machine in the form of an electric motor for a motor vehicle. The stator 100 is a stator which is known from the prior art, and is constituted, for example, by a plate stack with respective end windings on the respective ends of the stator 100 wherein, in this exemplary embodiment, a stator winding is provided in the form of a shaped-bar winding on the stator 100. As can be seen in FIG. 1A, respective shaped-bar ends 12 project from the upper side or the upper end face of the stator 100.

As can be seen from FIG. 1B, the interconnection device 10 comprises an annular interconnection element 14, which is described in greater detail hereinafter and which, in the present case, is only fitted to the upper annular end face of the stator 100, on the projecting shaped-bar ends 12. In this exemplary embodiment, the annular interconnection element 14 is constituted by an annular carrier plate 30 and an annular contact-making plate 40 wherein openings 16, which are described in greater detail hereinafter, are configured in the carrier plate 30, and a plurality of contact-making openings, together with the contacts 50, are configured in the contact-making plate 40. The contact-making openings are configured in an overlapping arrangement in relation to the openings 16.

Figure 2B:
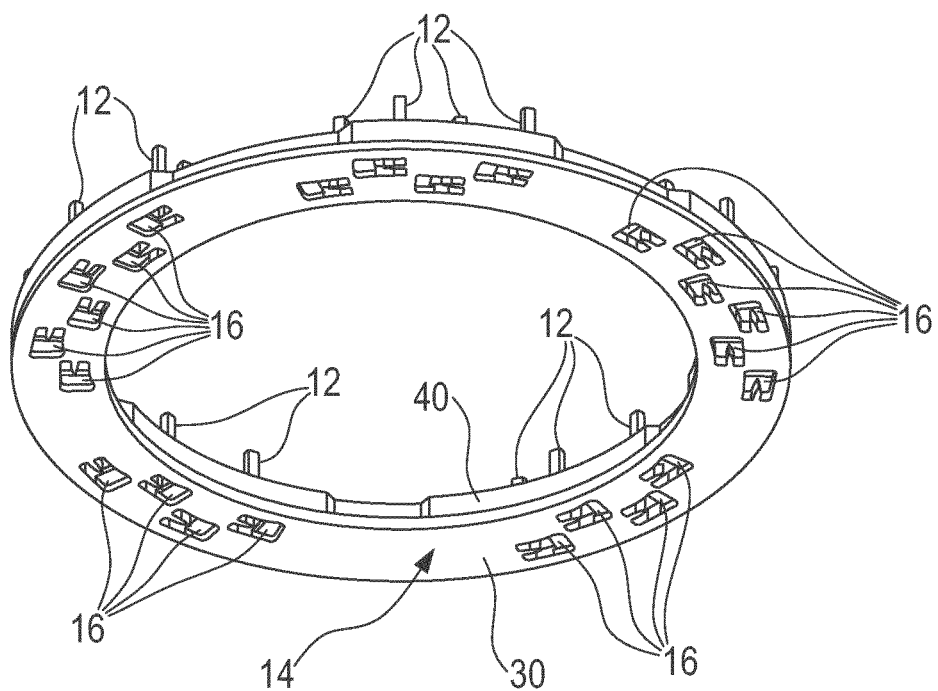

For the purposes of the fitting of the interconnection element 14 to the upper end face of the stator 100, the interconnection element 14 comprises the above-mentioned plurality of openings 16 for the insertion of the shaped-bar ends 18, as specifically illustrated in FIG. 2, wherein FIG. 2 shows a schematic representation of the interconnection device 10 according to FIG. 1. Specifically, a perspective view of the interconnection element 14 from above is represented in FIG. 2A, whereas a perspective view of the interconnection element 14 from below is represented in FIG. 2B.

As can be seen in FIG. 2, a plurality of openings 16 are provided in the interconnection element 14. FIG. 3 shows a schematic representation of a section of the interconnection device 10, according to FIG. 2, in an enlarged representation.

As can be seen from FIGS. 2 and 3, each of the openings 16 comprises an insertion section 20 and a contact-making section 22 adjoining the latter, which are configured such that the respective shaped-bar ends 12 can be inserted into the insertion section 20 and, in the event of a relative movement between the respective opening 16 and the respectively inserted shaped-bar end 12, the inserted shaped-bar end reaches the contact-making section 22. The distance between the shaped-bar end 12 and a contact 50, with which the respective shaped-bar end 12 is to be contact-connected, is reduced by way of being guiding through the contact-making section 22.

In this regard, FIG. 4 shows a schematic representation of the preferred operating principle of the interconnection device 10, according to FIG. 2, in an enlarged representation.

In the case represented, the contract-making section 22 comprises a centrally-arranged stud section 26, which is oriented in a longitudinal direction to the insertion section 20, and which dictates the distance between two shaped-bar ends 12 which are to be contact-connected. As can specifically be seen from FIGS. 3A to D and 4A to B, the contact-making section 22 comprises a guide apparatus 24 forming the guide (constituted by an opening wall and the stud section), which is designed, in the event of a relative movement between the opening 16 and the two shaped-bar ends 12, to reduce the distance between the two shaped-bar ends 12 and the respective contacts 50, and to lead said shaped-bar ends 12 onto the contacts 50.

As can further be seen from FIGS. 3 and 4, the insertion section 20 and the contact-making section adjoining the latter constitute an opening in the form of a rectangular elongated hole, or a virtually quadratic hole, wherein the opening surface area reduces from the insertion section 20 through to the contact-making section 22, on the grounds of the stud section 26.

The method according to the invention for assembling the interconnection device 10 is configured as follows.

Figure 3D:
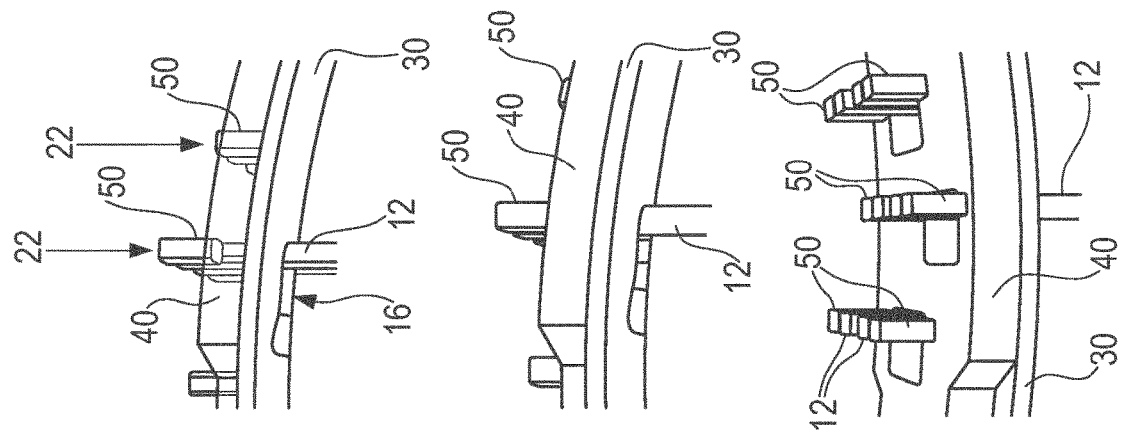
FIGS. 3A-3D are schematic representations of a section of the interconnection device according to FIG. 2, in an enlarged view.
Figure 3C:
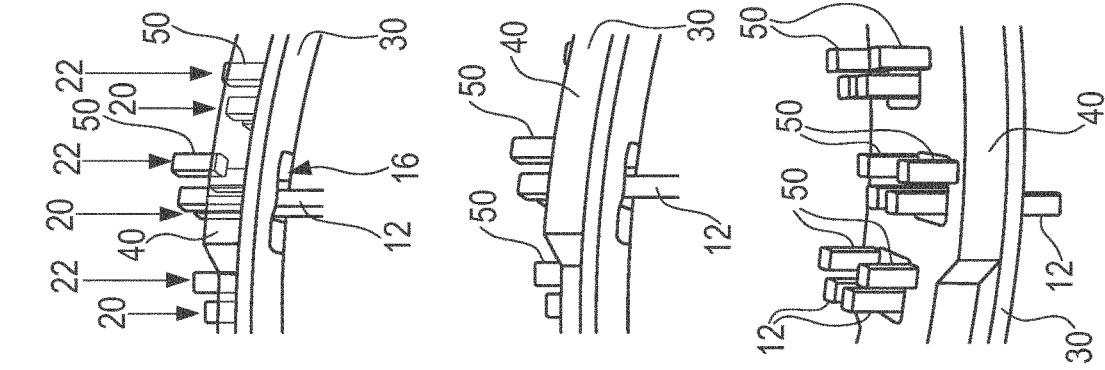
Figure 3B:
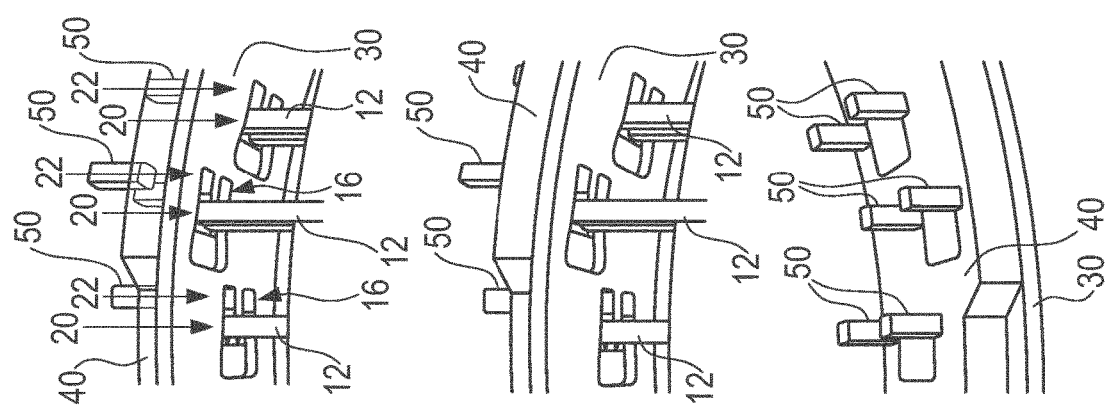
Figure 3A:
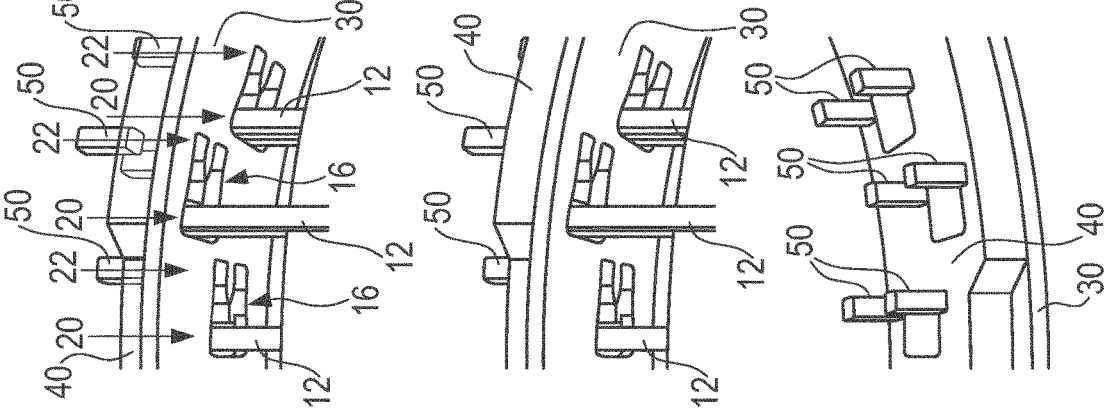

Firstly, the interconnection element 14 is fitted to the shaped-bar ends 12 which project from the upper end face of the stator 100, such that the shaped-bar ends 12 are inserted into the insertion section 20, as represented in FIGS. 3A and 4A.

Thereafter, the interconnection element 14 is moved relative to the shaped-bar ends 12, by way of rotation in the case represented in FIGS. 3B to 3D, such that the shaped-bar ends 12 reach the contact-making section 22 and, the distance between the shaped-bar ends 12 and the respective contacts 50 is reduced by means of the guide apparatus 24 through the contact-making section 22, as represented in an exemplary manner in FIGS. 3B to D and in FIG. 4B.

The respective shaped-bar ends 12 are then bonded to the respective contacts 50, preferably by welding.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An interconnection device for an electric machine for interconnecting shaped-bar ends of a winding, comprising:
    an interconnection element comprising an opening for an insertion of at least two shaped-bar ends, wherein
    the opening comprises an insertion section and a contact-making section adjoining the insertion section, which are configured such that the at least two shaped-bar ends are insertable into the insertion section and, in an event of a relative movement between the opening and the inserted shaped-bar ends, the inserted shaped-bar ends reach respective separate portions of the contact-making section, and a distance between the shaped-bar ends and respective contacts is reduced by way of guiding the shaped-bar ends through the contact-making section.

2. The interconnection device according to claim 1, wherein
the interconnection device is for a motor vehicle electric machine, and
the shaped-bar ends are of a stator winding of the motor vehicle electric machine.

3. The interconnection device according to claim 1, wherein
the contact-making section comprises a guide apparatus forming a guide, which is configured, in the event of a relative movement between the opening and the shaped-bar ends, to at least one of: (i) reduce the distance between the shaped-bar ends and the contact, and (ii) lead the shaped-bar ends onto the respective contacts.

4. The interconnection device according to claim 1, wherein
the insertion section and the contact-making section adjoining the insertion section constitute an opening in the form of an elongated hole or a circular arc, and
an opening surface area of the hole or arc reduces from the insertion section through to the contact-making section.

5. The interconnection device according to claim 1, wherein
the contact-making section comprises a stud section, which is oriented in a longitudinal direction or a circumferential direction to the insertion section, and is centrally arranged in the contact-making section, and
the stud section determines a distance between the two shaped-bar ends which are to be contact-connected in the contact-making section.

6. The interconnection device according to claim 1, wherein
the interconnection element comprises a carrier plate and a contact-making plate,
the opening is configured in the carrier plate and a contact-making opening is configured in the contact-making plate, together with the contacts, and
the contact-making opening is configured in an overlapping arrangement in relation to the opening.

7. An electric machine, comprising:
a stator; and
an interconnection device according to claim 1, wherein
the interconnection element of the interconnection device is fitted to at least one end of the stator, on the shaped-bar ends which project from the stator.

8. The electric machine according to claim 7, wherein
the electric machine is a motor vehicle electric machine.

9. A vehicle comprising an electric machine according to claim 8.

10. A method for assembling an interconnection device for an electric machine for interconnecting shaped-bar ends of a winding, wherein the interconnection device comprises an interconnection element comprising an opening for insertion of at least two shaped-bar ends, wherein the opening comprises an insertion section and a contact-making section adjoining the insertion section, which are configured such that the at least two shaped-bar ends are insertable into the insertion section of the opening and, in an event of a relative movement between the opening and the inserted shaped-bar ends, the inserted shaped-bar ends reach separate portions of the contact-making section, and a distance between the shaped-bar ends and respective contacts is reduced by way of guiding the shaped-bar ends through the contact-making section,
wherein the method comprises the steps of:
fitting the interconnection element to the shaped-bar ends which project from one end of a stator of the electric machine, such that the shaped-bar ends engage in the insertion section of the opening; and
moving the interconnection element relative to the shaped-bar ends, such that the shaped-bar ends reach the respective separate portions of contact-making section, and the distance between the shaped-bar ends and the respective contacts is reduced through the contact-making section.

11. The method according to claim 10, wherein
the moving of the interconnection element relative to the shaped-bar ends is a rotational movement.

12. The method according to claim 10, further comprising the step of:
connecting the shaped-bar ends to the respective contacts.

13. The method according to claim 12, wherein
the connecting of the shaped-bar ends to the respective contacts is carried out by welding.

\* \* \* \* \*